US012794310B2

(12) United States Patent
Komar et al.

(10) Patent No.: US 12,794,310 B2
(45) Date of Patent: Nov. 10, 2026

(54) CONNECTING SYSTEM FOR THE ELECTRICAL CONNECTING OF A DRIVE UNIT WITH A BATTERY IN AN ELECTRIC VEHICLE

(71) Applicant: Lisa Dräxlmaier GmbH, Vilsbiburg (DE)

(72) Inventors: Florian Komar, Velden (DE); Dominik Pflumm, Munich (DE); Robert Saller, Egglkofen (DE); Friedrich Staudinger, St. Wolfgang (DE); Thomas Weiss, Adlkofen (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 211 days.

(21) Appl. No.: 18/654,599

(22) Filed: May 3, 2024

(65) Prior Publication Data

US 2024/0396397 A1 Nov. 28, 2024

(30) Foreign Application Priority Data

May 24, 2023 (DE) ..................... 10 2023 113 637.2

(51) Int. Cl.
*H02K 3/50* (2006.01)
*H02K 5/22* (2006.01)
(Continued)

(52) U.S. Cl.
CPC ............... *H02K 5/225* (2013.01); *H02K 3/50* (2013.01); *H02K 5/24* (2013.01); *H02K 7/006* (2013.01);
(Continued)

(58) Field of Classification Search
CPC ........... H02K 5/225; H02K 3/50; H02K 5/24; H02K 7/006; H02K 2203/09; H02K 2213/09; B60K 1/00
(Continued)

(56) References Cited

U.S. PATENT DOCUMENTS

2010/0025078 A1* 2/2010 Wagener ................ H02G 5/025 174/168

FOREIGN PATENT DOCUMENTS

DE 202015103854 U1 8/2015
DE 102020130182 A1 5/2022
(Continued)

OTHER PUBLICATIONS

Nurtsch Bernd, Arrangement for Power Supply in a Vehicle, Apr. 20, 2023, DE 102021126905 (English Machine Translation) (Year: 2023).*
(Continued)

*Primary Examiner* — Alexander A Singh
(74) *Attorney, Agent, or Firm* — Burris Law, PLLC

(57) ABSTRACT

A connecting system for the electrical connection of an electric drive unit with an electric battery in an electric vehicle, in which the electric drive unit is supported in the electric vehicle with bearings that facilitate a driving-situation-dependent movement of the electric drive unit, the connecting system includes a double busbar for the energy transmission between the battery and the drive unit. The connecting system further includes a battery-side electrical contact connector for the electrical connection of the double busbar with the battery, a drive-side electrical contact connector for the electrical connection of the double busbar with the electric drive unit, and at least one fixing element for the fixing of the double busbar. The double busbar is configured to compensate for a relative movement, due to the driving-
(Continued)

situation-dependent movement of the electric drive unit, between the drive-side electrical contact connector and the battery-side electrical contact connector.

14 Claims, 3 Drawing Sheets

(51) Int. Cl.
*H02K 5/24* (2006.01)
*H02K 7/00* (2006.01)

(52) U.S. Cl.
CPC ..... *H02K 2203/09* (2013.01); *H02K 2213/09* (2013.01)

(58) Field of Classification Search
USPC ........................................................... 310/71
See application file for complete search history.

(56) References Cited

FOREIGN PATENT DOCUMENTS

| | | | | |
|---|---|---|---|---|
| DE | 102021112299 A1 | | 11/2022 | |
| DE | 102021127187 B3 | * | 3/2023 | ............ H02G 5/005 |
| DE | 102021126905 A1 | * | 4/2023 | ............. B60L 50/66 |

OTHER PUBLICATIONS

Hammerl et al., Dual Rail, Mar. 23, 2023, DE 102021127187 (English Machine Translation) (Year: 2023).*

* cited by examiner

CONNECTING SYSTEM FOR THE ELECTRICAL CONNECTING OF A DRIVE UNIT WITH A BATTERY IN AN ELECTRIC VEHICLE

CROSS-REFERENCE TO RELATED APPLICATIONS

This application claims priority to and the benefit of DE 10 2023 113 637.2 filed on May 24, 2023. The disclosures of the above applications are incorporated herein by reference.

FIELD

The present disclosure relates to a connecting system for the electrical connecting of an electric drive unit with an electric battery in an electric vehicle or battery-electric vehicle.

BACKGROUND

The statements in this section merely provide background information related to the present disclosure and may not constitute prior art.

Due to the relative movements between the electric motor of the electric drive unit ("Electric Drive Unit") and the high-voltage (HV) battery in the driving operation of an electric vehicle powered by a battery (BEV), the traction path may compensate for certain movements. Due to these relative movements, stresses arise in the electrical line, usually embodied as a round conductor, between the battery and the drive, as well as in the plugs for the plugging-on of the line onto the battery and the drive. In addition, such electrical lines embodied as round conductors have a high installation space due to the round-conductor geometry, they generate high electromagnetic-tolerance-in-the-environment (EMTE) emissions, and are difficult to automate.

SUMMARY

This section provides a general summary of the disclosure and is not a comprehensive disclosure of its full scope or all of its features.

The present disclosure provides an improved connection system that reduces the installation height of the conductor, reduces the EMTE emissions, and provides for an easier automation.

The present disclosure is based on the idea of using two massive busbars or current rails made of copper or aluminum in the form of a double busbar for the electrical connection of the two poles of the battery with the drive unit of the electric vehicle, and connecting the busbars to the battery and the drive unit via a plug system. The busbars are geometrically designed such that the relative movements can be compensated for elastically at free length. Mounts for the busbars provide a fixing of the rails in front of the plug system. The plug system can thus lie in the movement-damped region. Alternatively, a flexible element may be integrated into each busbar. Due to the parallel arrangement of the busbars with the wide surfaces one-over-the-other, lower electromagnetic emissions are emitted than with round conductors. Due to the flat geometry of the busbars, installation space can be saved in one dimension. This is interesting in the case of all-wheel drives, in which the associated output of the HV battery does not lie in the vicinity of the drive wheel, and thus the HV lines must cross the battery.

The present disclosure improves the electrical energy transfer between battery and drive in battery-electric vehicles. Relative movements between the battery and the drive unit are compensated for. EMC and EMTE emissions are thus reduced. In particular, the arrangement of the rails one-atop-the-other leads to a reduction of the EMTE emissions. Due to the use of busbars instead of the round conductors, the present disclosure is suited in particular for vehicles with scarce installation space, for example, in the case of battery crossing, i.e., when the electrical connection line must be guided to an opposite side of the battery (i.e., must cross the battery) in order to contact it there electrically. The two busbars together have a flatter installation height than a round conductor, and thus save installation space in the vehicle. In addition, the present disclosure leads to an improved automatability and a greater degree of automation in the installation in the vehicle.

According to a first aspect, the present disclosure provides a connecting system for the electrical connecting of an electric drive unit with an electric battery in an electric vehicle, in which the electric drive unit is supported in the vehicle with bearings that make possible a driving-situation-dependent movement of the electric drive unit, in which the connecting system includes the following: a double busbar for the energy transfer between the battery and the drive unit; a battery-side electrical contact connector for the electrical connection of the double busbar with the battery; a drive-side electrical contact connector for the electrical connection of the double busbar with the electric drive unit; at least one fixing element for the fixing of the double busbar; in which the double busbar is configured to compensate for a relative movement between the drive-side electrical contact connector and the battery-side electrical contact connector due to the driving-situation-dependent movement of the electric drive unit.

For example, on one side (drive side or battery side) the electrical contact connector can be represented as an electrical plug connection, and on the other side represented as an electrical screw connection, or on both sides represented as electrical screw connection, or on both sides represented as electrical plug connection.

Fixing elements can be attached, for example, to the chassis of the vehicle, or to the drive unit, battery, chassis supports, etc.

The connecting system provides that due to the construction of the double busbar in the form of two flat conductors, EMC and EMTE emissions are more strongly reduced than with a conventional round conductor. The connecting system is thus suited for vehicles with scarce installation space, for example, with battery crossing. The two busbars of the double busbar together have a flatter installation height than a conventional round conductor, and thus save installation space in the vehicle. With the use of the connecting system presented here, a higher degree of automation can be achieved, which simplifies assembly.

According to one form of the connecting system, the double busbar includes two electrically conducting busbars, extending longitudinally and parallel to each other, with flat cross-sections, which are each covered by an insulation and are stacked one-atop-the-other, flat side on flat side, into a busbar stack.

This results in that the double busbar has a lower installation height than a round conductor, and thus saves installation space.

According to one form of the connecting system, the double busbar includes at least one bend and/or at least one torsion, which confer additional elasticity to the double busbar.

It is understood that in one form the double busbar may not have a bend or torsion.

This results in that the double busbar can be routed in arbitrary directions in order to connect the battery with the drive unit. The double busbar may extend in a not straight path. The double busbar may also be routed around corners or connect different levels in the vehicle with one another. The double busbar is thus flexibly routable, and the drive unit and battery can be installed at any locations in the vehicle.

According to one form of the connecting system, the double busbar includes at least two parts that are connected to one another via a respective electrical connector.

In the case of long double busbars, the double busbar can also be formed as two-parts, and the two parts may be connected with each other by an electrical connector, e.g., screw connection. The electrical connector can be attached, for example, in the middle of the two parts. In the case of long bars, length changes result due to thermal influences, which are to be compensated for or at least reduced via the electrical connector. It is thus also easier to manufacture long double busbars as two parts than to produce a single very long double busbar.

According to one form of the connecting system, the at least one fixing element is configured to divert forces from the double busbar onto the chassis of the electric vehicle, and to suppress an exertion of force on the two electrical plug connectors.

The forces may be diverted, for example, onto the chassis or via the chassis carrier, the battery, or the drive unit via the chassis.

This results in that the plug system may be located in the forceless region with the two contact connectors, and thus is free from external stresses.

According to one form of the connecting system, the connecting system includes at least two fixing elements, in which a first fixing element is attached to the double busbar in the region of the battery-side electrical contact connector, and in which a second fixing element is attached to the double busbar in the region of the drive-side electrical contact connector.

This results in a better fixing with two or more fixing elements. Longer double busbars can thus also be realized that effectively divert the forces or movements onto the chassis via the screw-on components (battery, chassis carrier, etc. . . . ). The battery can thus be attached in the vehicle further removed from the drive unit.

According to one form of the connecting system, the double busbar has a bend in the region behind the first fixing element, and is fixable to the chassis of the electric vehicle behind the bend via a third fixing element; and/or the double busbar has a bend in the region behind the second fixing element, and is fixable to the chassis of the electric vehicle behind the bend via a fourth fixing element.

Here the region behind the first fixing element is based on the battery-side end of the double busbar to which the first fixing element is attached. That is, first comes the battery-side end of the double busbar, then the first fixing element, then the bend, and then the third fixing element. Such a representation is found, for example, in FIG. 2. Instead of or in addition to the bend, a torsion can also be present here.

In an analogous manner, the region behind the second fixing element is based on the drive-side end of the double busbar to which the second fixing element is attached. That is, first comes the drive-side end of the double busbar, then the second fixing element, then the bend, and then the fourth fixing element. Such a representation is found, for example, in FIG. 2. Instead of or in addition to the bend, a torsion can also be present here.

Such an arrangement brings the technical advantage that the double busbar is connected with the vehicle chassis, straight with a direction change (by the bend or torsion).

According to one form of the connecting system, the connecting system includes at least one flexible retaining element for the retaining of the double busbar; in which the at least one flexible retaining element is configured to suppress resonance vibrations of the double busbar. The flexible retaining element is an optional component.

This brings the technical advantage that the flexible retaining element is in the position to suppress resonance vibrations that are generated, for example, by the double busbar. It is understood that the flexible retaining element is also in the position to suppress other vibrations of the double busbar that may not arise due to the resonances of the double busbar.

According to one form of the connecting system, the at least one fixing element surrounds the double busbar around a longitudinal direction of the double busbar and fixes it in a friction-fit manner.

This also has the technical advantage of permitting the fixing element to be easily formed, and mitigating effects by its surroundings via an effective fixing of the double busbar.

According to one form of the connecting system, the at least one fixing element is openable, and in the opened state can be placed around the double busbar.

This results in that the fixing element can be formed easily and can be mounted on the double busbar.

According to one form of the connecting system, in the opened state the at least one fixing element includes two housing halves, which are each configured to include a part of the double busbar; and the at least one fixing element includes a lock element that is configured to lock the two housing halves to each other in the closed state.

This results in that the two housing halves can include the double busbar in a friction-fit and interference-fit manner in order to divert forces and movements of the double busbar to the vehicle chassis, in order to hold the plug system in the forceless region.

According to a second aspect, the present disclosure provides a method for the manufacturing of a connecting system for the electrical connecting of an electric drive unit with an electric battery in an electric vehicle, in which the electric drive unit is supported in the electric vehicle with bearings that make possible a driving-situation-dependent movement of the electric drive unit, in which the method includes the following: providing a double busbar for the energy transfer between the battery and the drive unit, producing a battery-side electric contact connector for the electrical connecting of the double busbar with the battery; producing a drive-side electrical contact connector for the electrical connecting of the double busbar with the electric drive unit; and producing of at least one fixing element for the fixing of the double busbar; in which the double busbar is configured to compensate for, due to the driving-situation-dependent movement of the electric drive unit, a relative movement between the drive-side electrical contact connector and the battery side electrical contact connector.

The producing can be an injection-molding or a pressure die-casting, for example, an aluminum die-casting. The producing can also be affected by extrusion. A stamping process or a stamping-bending process can also be used.

The method provides that a connecting system as described above can be produced in a simple manner.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The figures are merely schematic representations and serve only for the explaining of the present disclosure. Identical or functionally identical elements are provided throughout with the same reference numbers.

Figure 1A:
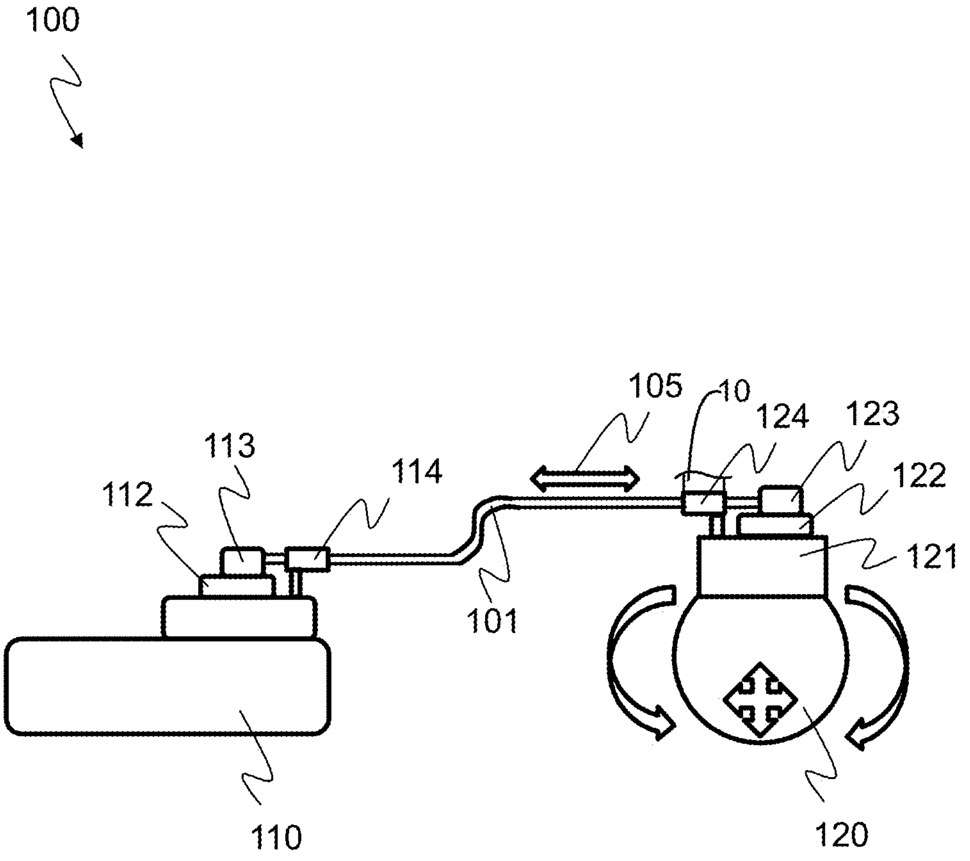
FIG. 1A shows a side view of a schematic representation of a traction section of a battery-electric vehicle, illustrating a connecting system electrically connecting a drive unit with a battery, according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following detailed description, reference is made to the accompanying drawings that form a part thereof, and in which example forms are shown as illustration, in which the present disclosure can be explained. It is understood that other forms may also be used, and structural or logical changes can also be undertaken, without deviating from the concept of the present disclosure. The following detailed description is therefore not to be understood in a limiting sense. Furthermore, it is understood that the features of the different exemplary forms described herein can be combined with one another if not specifically indicated otherwise.

The aspects and forms are described with reference to the drawings, in which identical reference numbers generally refer to identical elements. In the following description, for the purpose of explanation numerous specific details are presented in order to convey a detailed understanding of one or more aspects of the present disclosure. However, for a person skilled in the art it can be obvious that one or more aspects or forms can be embodied with a lesser degree of the specific details. In other cases, known structures and elements are depicted in schematic form in order to facilitate the describing of one or more aspects or forms. It is understood that other forms can be used, and structural or logical changes can be undertaken, without deviating from the concept of the present disclosure.

FIG. 1A shows a schematic representation of a connecting system 100 for use in the traction section of battery-electric vehicles (not shown).

The connecting system 100 serves for the electrical connection of an electric drive unit, which includes an electric motor 120 and an inverter 121, with an electric battery 110 in an electric vehicle (not shown). The electric drive unit 120, 121 is supported in the electric vehicle with bearings that facilitate a driving-situation-dependent movement of the electric drive unit 120, 121.

The connecting system 100 includes a double busbar 101 for the energy transmission between the battery 110 and the electric drive unit 120, 121.

The connecting system 100 includes a battery-side electrical contact connector 113 for the electrical connection of the double busbar 101 with the battery 110.

The connecting system 100 includes a drive-side electrical contact connector 123 for the electrical connection of the double busbar 101 with the electric drive unit 120, 121.

The connecting system 100 includes at least one fixing element 114, 124 for the fixing of the double busbar 101, for example, on a chassis 10 of the electric vehicle (not shown), or on the electric drive unit 120, 121, the battery 110, the chassis carrier (not shown), or other vehicle components (not shown).

The double busbar 101 is configured to compensate for a relative movement, due to the driving-situation-dependent movement of the electric drive unit 120, 121, between the drive-side electrical contact connector 123 and the battery side electrical contact connector 113.

For example, on one side (drive side or battery side), the electrical contact connector 113, 123 can be represented as an electrical plug connection, and on the other side be represented as an electrical screw connection, or on both sides be represented as an electrical screw connection, or on both sides be represented as an electrical plug connection.

Fixing elements 114, 124 can be attached, for example, to the chassis 10 of the vehicle (not shown), or to the electric drive unit 120, 121, or the battery 110, or to the chassis carrier (not shown), or to other components (not shown) of the vehicle.

Figure 1B:
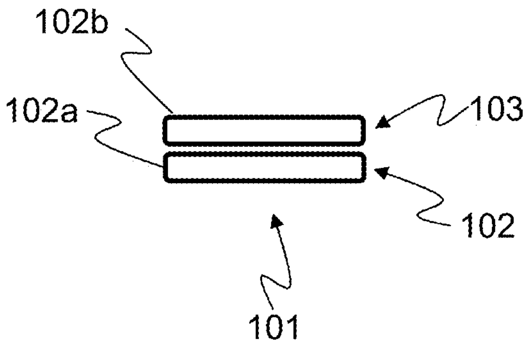
FIG. 1B shows a cross-sectional view through a double busbar of the connecting system of FIG. 1A, according to the present disclosure.

The double busbar 101 includes two busbars or current rails and is constructed, for example, according to the drawing in FIG. 1B. It includes two electrically conductive busbars 102, 103, extending longitudinal and parallel to each other, with flat cross-sections, which are each covered by an insulation 102*a*, 102*b*, and are stacked one-atop-the-other, flat side on flat side, into a busbar stack.

The double busbar 101 has, for example, one or more bends, as shown in FIG. 1A, which confer the double busbar 101 additional elasticity. Alternatively or additionally, the double busbar 101 can have one or more torsions or rotations, which also provide for an additional elasticity. In one form the double busbar 101 also may be such that it does not have any bend or torsion.

The at least one fixing element 114, 124 is configured to divert forces or movements 105 from the double busbar 101 onto the chassis 10 of the electric vehicle, and to suppress a force exertion on the two electrical contact connectors 113, 123.

FIG. 1A schematically shows the use of the high-voltage line with flat conductors and plug system in the traction section of battery-electric vehicles.

The flat conductors or busbars 102, 103 that are condensed here to one busbar 101 serve for the energy transfer between battery 110 and inverter 121. A plug system provides for the contacting at the units. The inverter 121 and electric motor 120 usually form a common unit, the electric drive unit 120, 121.

The electric drive unit 120, 121 is, for example, suspended with elastomer bearings and can, depending on the driving situation, move in the limits of its bearing assembly. Relative movements thereby arise between the terminal 112, 122 of the electric drive unit 120, 121 and the battery 110. These relative movements may be elastically compensated for by the busbars 102, 103 of the double busbar 101. The force introduction and dissipation is affected by locking elements/fixing elements 114, 124 of the busbars 102, 103 of the double busbar 101. The plug system is thereby located in the forceless region and is free from external stresses. Damage to the contact system by movement effects can thus be precluded.

Figure 3A:
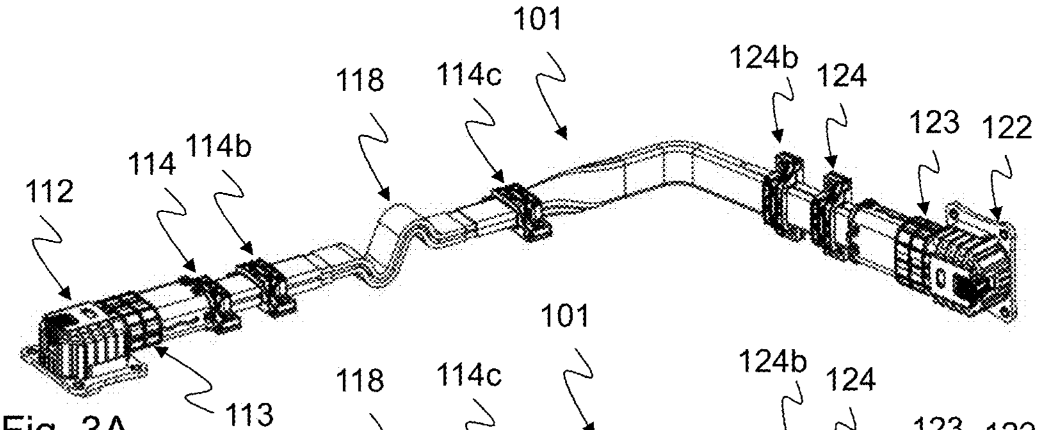
FIG. 3A shows a perspective view of a connecting system of a second form according to the present disclosure.
Figure 3B:
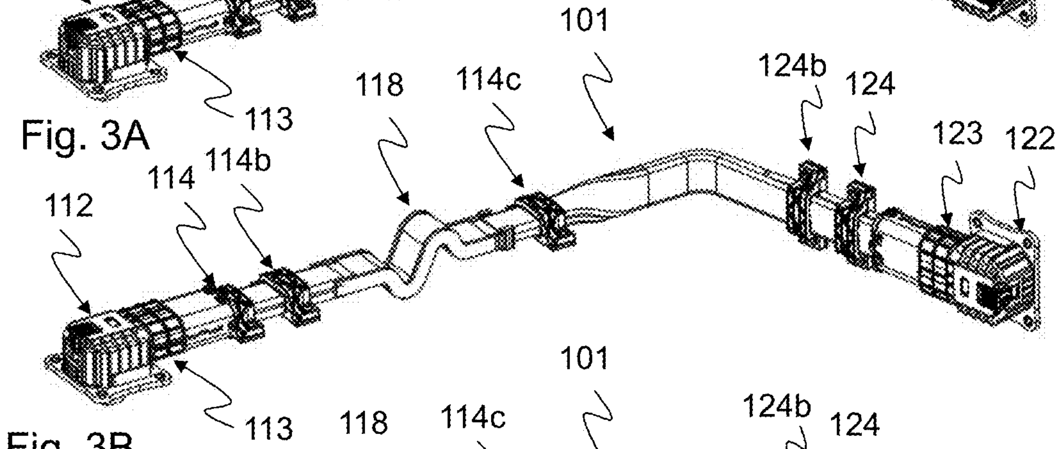
FIG. 3B shows a perspective view of a connecting system of a third form according to the present disclosure.
Figure 3C:
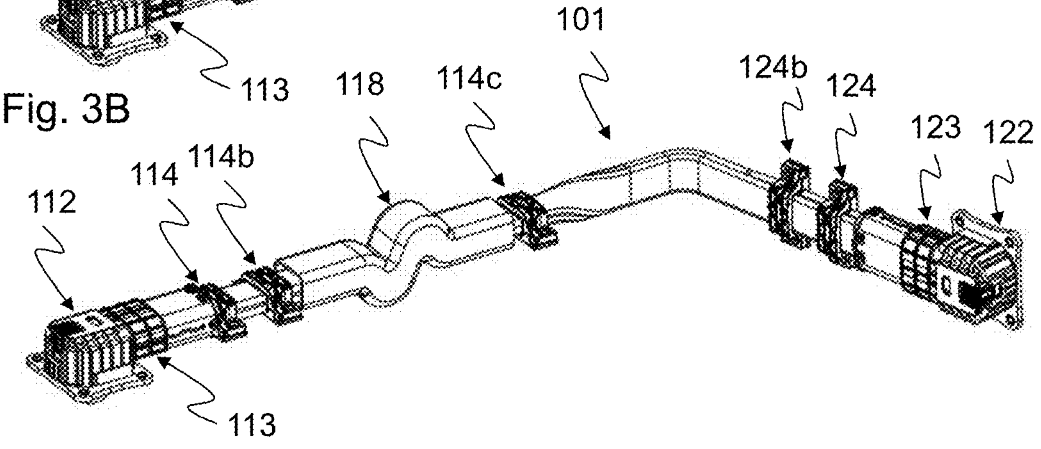
FIG. 3C shows a perspective view of a connecting system of a fourth form according to the present disclosure.

In the case of the busbars 102, 103 being too stiff, for example, with short lengths or large cross-sections, a flexible element or an electrical connector 118 can be integrated into the busbar 102, 103, as is shown and described in more detail in FIG. 3A-3C.

To counter resonance frequencies inside the busbar 102, 103, flexible mounts or flexible retaining elements 125 can support the system against the chassis 10.

FIG. 1B shows a cross-section through a double busbar 101.

As shown in FIG. 1B, the double busbar 101 includes two electrically conductive current rails, or busbars 102, 103 extending longitudinally and parallel to each other, in the previous section also referred to as busbars 102, 103, with flat cross-section, that is each covered by an insulation 102*a*, 102*b*, and are stacked one-atop the-other, flat side on flat side, into a busbar stack.

Figure 2:
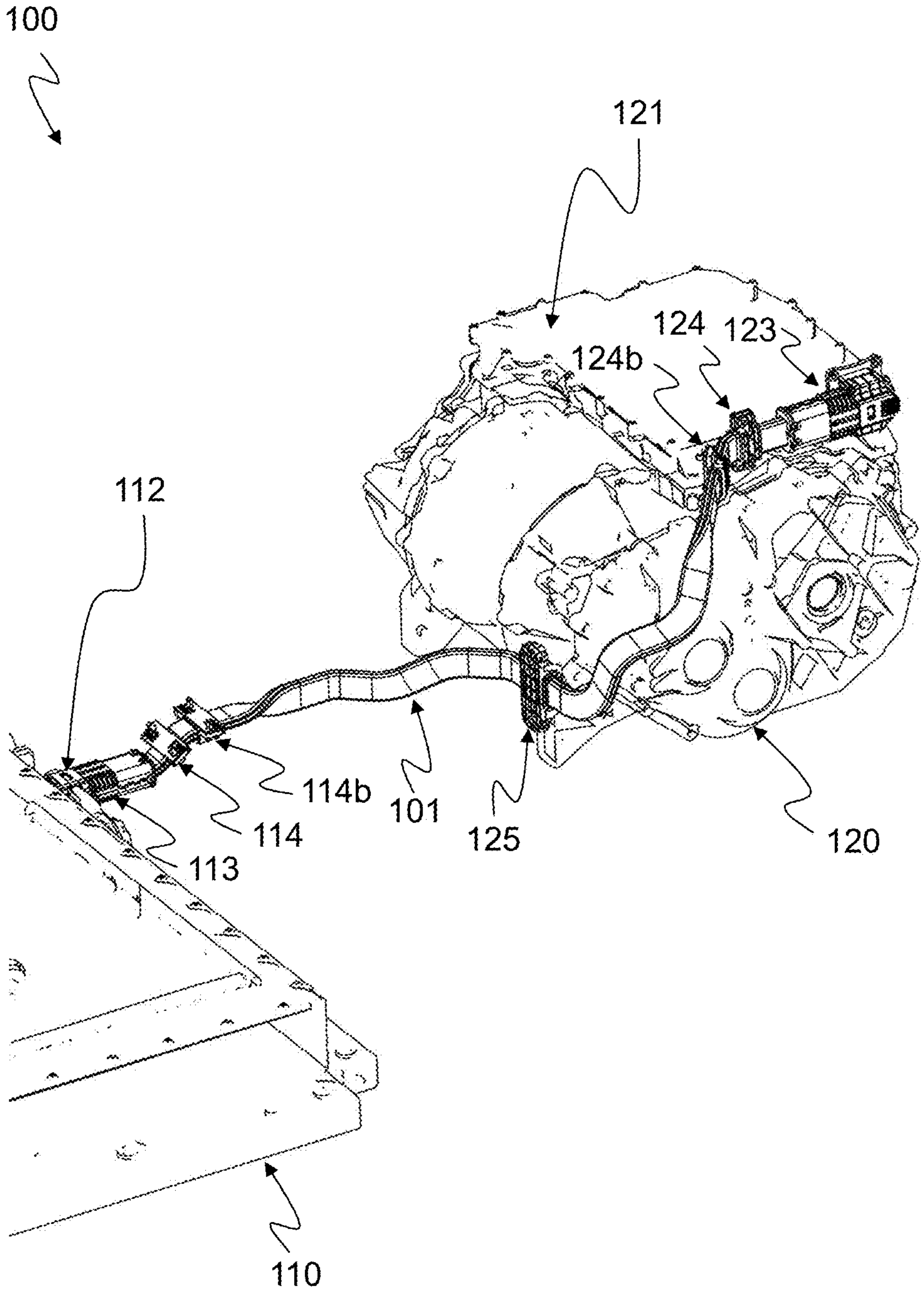
FIG. 2 shows a perspective view of the traction section of FIG. 1A, illustrating the connecting system in a first form, according to the present disclosure.

FIG. 2 shows a 3D representation of the traction section of an electric vehicle with the connecting system 100 for the electrical connecting of the electric drive unit 120, 121 with the battery 110.

The connecting system 100 shown here corresponds to the connecting system 100 described above for FIGS. 1A and 1B.

The connecting system 100 serves for the electrical connecting of the electric drive unit 120, 121 with the electric battery 110 in the electric vehicle, in which the electric drive unit 120, 121 is supported in the electric vehicle with bearings that make possible a driving-situation-dependent movement of the electric drive unit 120, 121.

The connecting system 100 includes the following: a double busbar 101 for the energy transfer between the battery 110 and the electric drive unit 120, 121; a battery-side electrical contact connector 113 for the electrical connection of the double busbar 101 with the battery 110; a drive-side electrical contact connector 123 for the electrical connection of the double busbar 101 with the electric drive unit 120, 121; and at least one fixing element 114, 124 for the fixing of the double busbar 101.

The double busbar 101 is configured to compensate for a relative movement, due to the driving-situation-dependent movement of the electric drive unit 120, 121, between the drive-side electrical contact connector 123 and the battery-side electrical contact connector 113.

Although there are forms of the connecting system with only one fixing element, the connecting system 100 shown in FIG. 2 includes two or more fixing elements 114, 124, in particular a number of four such fixing elements 114, 114*b*, 124, 124*b*. Here, a first fixing element 114 is attached to the double busbar 101 in the region of the battery-side electrical contact connector 113; and a second fixing element 124 is attached to the double busbar 101 in the region of the drive-side electric contact connector 123.

In the form of FIG. 2, the double busbar 101 has a bend in the region behind the first fixing element 114, and is fixable to the chassis 10 of the electric vehicle behind the bend via a third fixing element 114*b*.

In the region behind the second fixing element 124, the double busbar 101 according to FIG. 2 has a bend, and is fixable to the chassis 10 of the electric vehicle behind the bend via a fourth fixing element 124*b*.

In addition, the connecting system 100 depicted in FIG. 2 includes at least one flexible retaining element 125 for the retaining of the double busbar 101, for example, on the chassis 10 of the electric vehicle, or a battery 110, or the chassis carrier, or the electric drive unit 120, 121, or on other vehicle components, in which in FIG. 2 only one such retaining element 125 is shown. It is understood that a plurality of such retaining elements 125 can be provided. The flexible retaining element 125 is an optional component.

The at least one flexible retaining element 125 is configured to suppress resonance vibrations of the double busbar 101.

The at least one fixing element 114, 114*b*, 114*c* (shown in FIGS. 3A-3C), 124, 124*b* is configured to surround the double busbar 101 around a longitudinal direction of the double busbar 101, and fix it in a friction-fit manner.

The at least one fixing element 114, 114*b*, 114*c* (shown in FIGS. 3A-3C), 124, 124*b* may be configured to open, and can be placed around the double busbar 101 in the opened state.

In the opened state, the at least one fixing element 114, 114*b*, 114*c* (shown in FIGS. 3A-3C), 124, 124*b* includes, for example, of two housing halves, which are configured to each include a part of the double busbar 101.

The at least one fixing element 114, 114*b*, 114*c* (shown in FIGS. 3A-3C), 124, 124*b* includes, for example, a closure element that is configured to close the two housing halves with each other in the closed state.

FIG. 2 shows an exemplary system with all components inside a vehicle environment. A flat-conductor plug system or battery-side electrical contact connector 113 is located at the rail ends. The double busbar 101 is fixed or secured by four "fixed" mounts or fixing elements 114, 114*b*, 114*c* (shown in FIGS. 3A-3C), 124, 124*b*. In the middle of the rails or busbars 102, 103, a flexible holder or flexible retaining element 125 is located to counter resonance vibrations or reaction vibrations.

FIG. 2 thus represents the following: 1.) combination of flat conductor made of solid material with corresponding fixings, in combination with plug system, used in a dynamic environment; 2.) parallel arrangement of the busbars 102, 103 with the wide surfaces one-atop-the-other for lower electromagnetic emissions than with round conductors by opposing-side field cancellation, optionally a shielding of the busbars 102, 103 can be added; 3.) due to the flat geometry of the busbars 102, 103, as shown in FIG. 1B, installation space can be saved in one dimension, this is interesting in particular in the z-direction with the presence of a battery crossing; and 4.) higher degree of automation in the vehicle due to non-flexible component.

FIGS. 3A-3C show perspective views of connecting systems 100 with three example alternate forms of electrical connectors 118 for the electrical connecting of two parts of a double busbar 101.

The connecting systems 100 of FIGS. 3A-3C are forms of the connecting system 100 described above for FIGS. 1A and 2. In FIGS. 3A-3C, however, the connecting system 100 additionally includes an electrical connector 118 for the electrical connecting of two parts of a double busbar 101. This electrical connector 118 can be used, for example, with double busbars 101 with an increased length.

The electrical connector 118 can include two metal strips, which respectively connect the two parts of the double busbar 101 with each other electrically. These two metal strips have two or more bend points in different directions, as shown in FIGS. 3A-3C. The electrical connector 118 thus also serves as tolerance compensation element for the double busbar 101.

In an alternative form of the electrical connectors 118, the two metal strips, or at least one of the two metal strips, include a slat packet made of at least two slats that extend essentially uniformly. The slats are strip shaped and shaped significantly wider than thick. For the producing of the slat packet, the slats are packetized. During the packetizing of the slat packet the slats are thickly stacked one-atop-the-other and connected to one another at opposite ends in an electrically conductive manner. In a central region the slats are not mechanically connected with each one another.

FIG. 3A shows an electrical connector 118 without further auxiliary components. The two metal strips extend approximately parallel to each other and are spaced from each other. An air gap is located between the two metal strips for insulation. The two metal strips, or at least one of the two metal strips, can be shaped, for example, as slat packets, as described above.

FIG. 3B shows an electrical connector 118 with an electrical insulator, for example, made of plastic. The two metal strips are separated from each other by the electrical insulator so that no undesired contact can occur. The two metal strips, or at least one of the two metal strips, can be shaped, for example, as slat packets.

FIG. 3C shows an electrical connector 118 with seal system. The two metal strips extend, with or without electrical insulator, parallel to each other and are closed off from the environment by the seal system, so that no undesired influence can arise due to the environment. The two metal strips, or at least one of the two metal strips, can be shaped, for example, as slat packets, as described above.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A connecting system for an electrical connection of an electric drive unit with an electric battery in an electric vehicle, wherein the electric drive unit is supported in the electric vehicle with bearings that are configured to facilitate a driving-situation-dependent movement of the electric drive unit, wherein the connecting system comprises:

a double busbar configured to transmit energy between the electric battery and the electric drive unit;

a battery-side electrical contact connector configured to electrically connect the double busbar with the electric battery:

a drive-side electrical contact connector configured to electrically connect the double busbar with the electric drive unit; and at least one fixing element configured to secure the double busbar:

wherein the double busbar is configured to compensate for a relative movement, due to the driving-situation-dependent movement of the electric drive unit, between the drive-side electrical contact connector and the battery-side electrical contact connector and wherein the at least one fixing element is configured to divert forces from the double busbar onto a chassis of the electric vehicle, and to suppress a force effect on the battery-side electrical contact connector and the drive-side electrical contact connector.

2. The connecting system according to claim 1, wherein the double busbar comprises two electrically conductive busbars, extending longitudinally and parallel to each other, wherein each electrically conductive busbar of the two electrically conductive busbars includes a flat cross-section, wherein each electrically conductive busbar of the two electrically conductive busbars is covered by an insulation and are stacked one-atop-the-other, flat side on flat side, into a busbar stack.

3. The connecting system according to claim 1, wherein the double busbar has at least one bend and at least one torsion that confers additional elasticity to the double busbar.

4. The connecting system according to claim 1, wherein the double busbar has at least one bend that confers additional elasticity to the double busbar.

5. The connecting system according to claim 1, wherein the double busbar has at least one torsion that confers additional elasticity to the double busbar.

6. The connecting system according to claim 1, wherein the double busbar comprises at least two parts that are connected with one another via a respective electrical connector.

7. The connecting system according to claim 1, wherein the at least one fixing element includes at least two fixing elements, wherein a first fixing element is attached to the double busbar in a region of the battery-side electrical contact connector, and wherein a second fixing element is attached to the double busbar in the region of the drive-side electrical contact connector.

8. The connecting system according to claim 7, wherein the double busbar has a bend in the region behind the first fixing element, and is fixable to a chassis of the electric vehicle behind the bend via a third fixing element.

9. The connecting system according to claim 8, wherein the double busbar has a bend in the region behind the second fixing element, and is fixable to the chassis of the electric vehicle behind the bend via a fourth fixing element.

10. The connecting system according to claim 7, wherein the double busbar has a bend in the region behind the second fixing element, and is fixable to a chassis of the electric vehicle behind the bend via a fourth fixing element.

11. The connecting system according to claim 1, further comprising at least one flexible retaining element configured to secure the double busbar on a chassis of the electric vehicle;

wherein the at least one flexible retaining element is configured to suppress reaction vibrations of the double busbar.

12. The connecting system according to claim 1, wherein the at least one fixing element surrounds the double busbar around a longitudinal direction, and secures the double busbar in a friction-fit manner.

13. The connecting system according to claim 1, wherein the at least one fixing element is configured to open, and be placed around the double busbar in an opened state.

14. The connecting system according to claim 13, wherein the at least one fixing element in the opened state includes two housing halves, which are configured to each include a part of the double busbar; and wherein the at least one fixing element includes a closure element that is configured to close the two housing halves with each other in a closed state.

* * * * *